US009699957B2

(12) United States Patent
Johnson et al.

(10) Patent No.: US 9,699,957 B2
(45) Date of Patent: Jul. 11, 2017

(54) AIR SUPPLY SYSTEM INTEGRATED INTO A SEED HOPPER ASSEMBLY

(71) Applicant: CNH Industrial America LLC, New Holland, PA (US)

(72) Inventors: Chad M. Johnson, Arlington Heights, IL (US); Scott A. Long, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 23 days.

(21) Appl. No.: 14/755,409

(22) Filed: Jun. 30, 2015

(65) Prior Publication Data

US 2017/0000018 A1    Jan. 5, 2017

(51) Int. Cl.
*A01C 7/04* (2006.01)
*A01C 7/08* (2006.01)
*A01C 15/00* (2006.01)

(52) U.S. Cl.
CPC .............. *A01C 7/082* (2013.01); *A01C 7/046* (2013.01); *A01C 15/006* (2013.01)

(58) Field of Classification Search
CPC combination set(s) only.
See application file for complete search history.

(56) References Cited

U.S. PATENT DOCUMENTS

| | | | |
|---|---|---|---|
| 2003/0177966 A1* | 9/2003 | Lee | A01C 7/081 111/175 |
| 2005/0028714 A1* | 2/2005 | Hagen | A01C 15/006 111/174 |
| 2008/0264313 A1* | 10/2008 | Sauder | A01C 7/046 111/174 |
| 2010/0307398 A1* | 12/2010 | Naylor | A01C 7/081 111/200 |
| 2015/0296702 A1* | 10/2015 | Audigie | A01C 7/081 222/637 |

* cited by examiner

*Primary Examiner* — Alicia Torres
(74) *Attorney, Agent, or Firm* — Rebecca L. Henkel; Rickard K. DeMille (57) ABSTRACT

A seed planting implement includes a monolithic body defining a seed hopper and an air supply system for a seed meter of the implement. The air supply system includes an air inlet manifold and an air channel from the manifold to the seed meter. A screen on the manifold is easily removed for servicing. A housing of the seed meter partially defines the channel during use.

14 Claims, 10 Drawing Sheets

AIR SUPPLY SYSTEM INTEGRATED INTO A SEED HOPPER ASSEMBLY

BACKGROUND OF THE INVENTION

1. Field of the Invention

The present invention generally relates to agricultural seed planting implements and to the seed meter assemblies of such implements, and more particularly to the air supply of vacuum systems of the seed meter assemblies.

2. Description of the Related Art

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed metering device provides individual seeds at a controlled rate for deposit in the seed trench. Furrow closing components of each row unit close the seed trench in a controlled manner.

Seed metering devices on seed planting implements receive bulk quantities of seeds from a seed hopper or bin, individualize the seeds and dispense the seeds at precise intervals for deposit into the seed trench. Different types of seed metering devices and systems are known. In a known type of seed meter, a seed disc defines seed cells at the periphery thereof. The seed disc is rotated in a controlled manner, including passing along a seed reservoir containing a small quantity of seeds. Vacuum is applied against the opposite side of the seed disc from the seed reservoir and individual seeds are drawn into or against the seed cells from the seed reservoir. Individual seeds are carried by the seed disk to a point in its path of rotation at which the vacuum is terminated. The individual seeds are then dropped into a seed tube or channel for placement into the seed trench formed in the ground.

Effective and accurate operation of a seed metering device as described above requires a steady, uninterrupted flow of air into the system. Operation in a field environment presents challenges to the continuous, effective operation of a seed metering system in that farm implements traversing a field raise considerable dust and debris. In the immediate area of the seed metering device, the seed planting or row units raise additional dirt and debris while opening the seed trench and closing the seed trench in front of and behind the seed metering device. Further, the row units can be relatively closely spaced side-by-side so that each row unit contributes to the dirty environment not only for the metering device operating on it, but also for the metering devices operating on other row units near to it. Environmental conditions such as wind and rain, soil condition and soil type also contribute to the generation of a difficult to control, dirty environment. Known air supply systems for seed metering devices have included air inlets that are prone to plugging or obstruction. Inadequate air supply can cause less effective operation of the seed metering device, resulting in missed seeds, seed bunching or even complete failure of the seed metering device.

What is needed in the art is an air supply system for a seed metering device that is less prone to plugging or obstruction yet simple in design and easy to service.

SUMMARY OF THE INVENTION

The present invention provides an air channel or conduit integral with the hopper structure of the row unit, with an inlet screen positioned to inhibit obstruction or plugging and to facilitate service.

In one form thereof, the invention is directed to an agricultural seed planting implement with a seed planting unit including a seed hopper base, a seed meter connected to the seed hopper base; a vacuum system fluidly connected to the seed meter; and an air supply system in fluid flow communication with the vacuum system through the seed meter, the air supply system being integrally formed in the seed hopper base.

In another form, the invention is directed to an agricultural seed planting implement, with a monolithic body defining a seed hopper and an air supply system having an air inlet opening. A seed meter is connected to the monolithic body. The seed meter includes air inlet vents in fluid flow communication with the air supply system, A vacuum system is fluidly connected to the seed meter and in fluid flow communication with the air supply system through the seed meter.

In a further form thereof, the invention is directed to an agricultural seed planting implement with a seed metering system and a monolithic body defining a seed hopper and an air supply system including an air inlet manifold having an air inlet manifold opening and an air channel in fluid flow communication with the air inlet manifold. Air inlet vents in the seed metering system are in fluid flow communication with the air channel.

An advantage of the air supply system disclosed herein is that it is less prone to plugging and obstruction.

Another advantage of the air supply system disclosed herein is that it is easily serviced.

Still another advantage of the air supply system disclosed herein is that it is compact and requires few parts.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
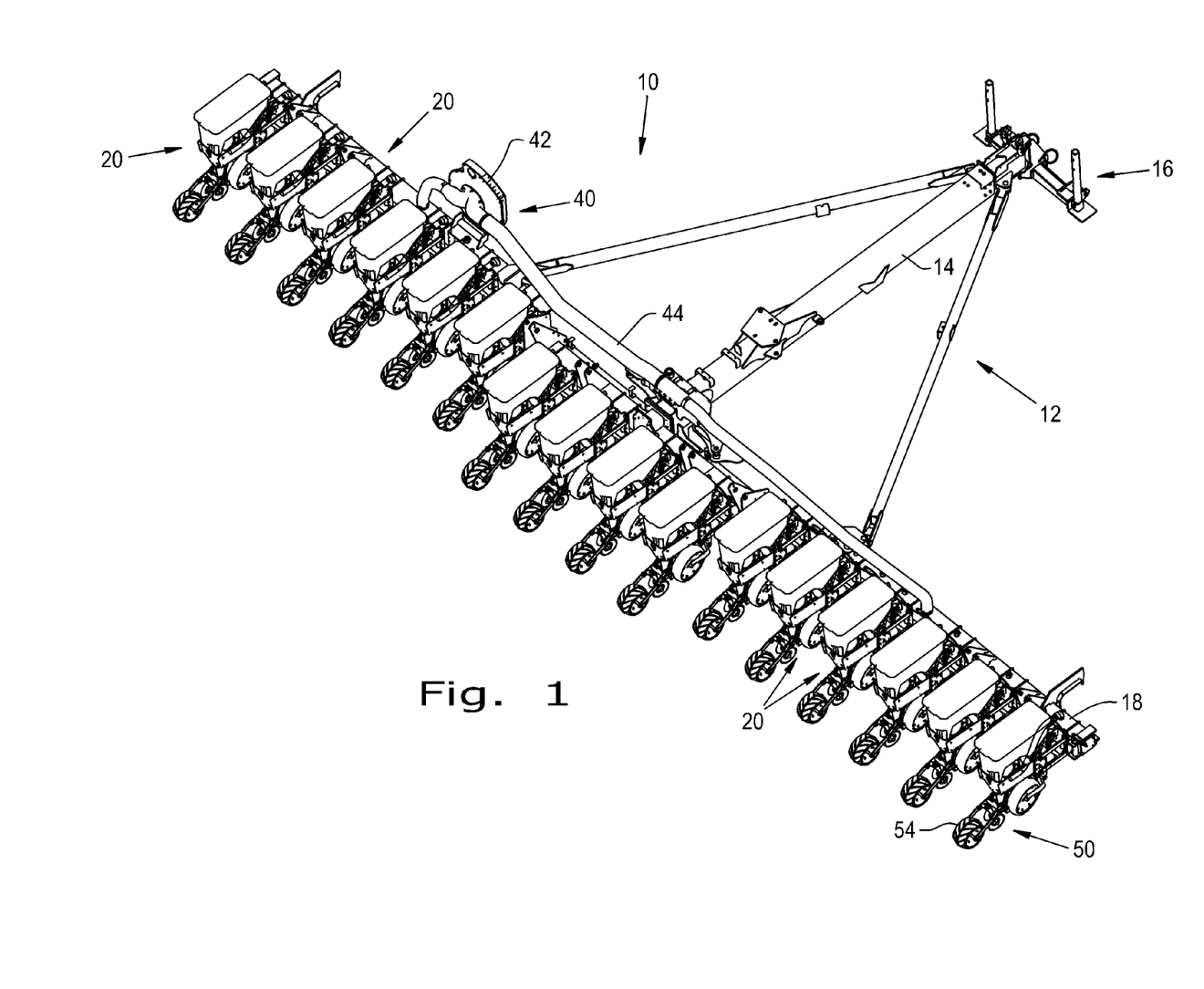
FIG. 1 is a perspective view of an agricultural seed planting implement having an air supply system as disclosed herein.
Figure 4:
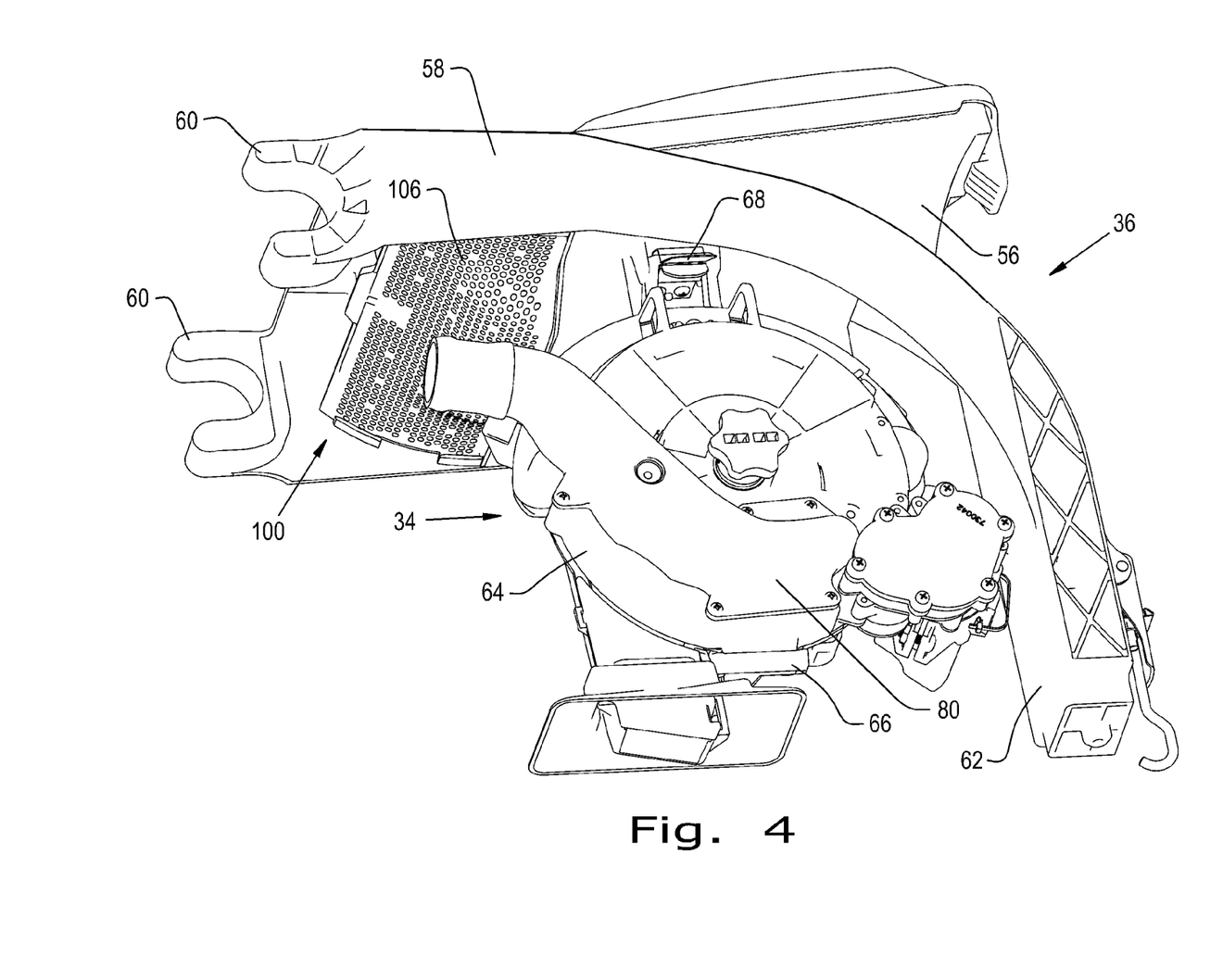
FIG. 4 is a perspective view showing the underside of a seed hopper assembly for the row unit shown in FIGS. 2 and 3.

Referring now to the drawings more specifically and to FIG. 1 in particular, a seed planting implement 10 is shown that includes an integrated air supply system 100 (FIG. 4). Seed planting implement 10 has a frame that includes a tow bar assembly 12 having a tow bar 14 and a connection assembly 16 at the longitudinally forward end thereof configured for mating with a corresponding hitch of a tractor or other work vehicle (not shown) for pulling seed planting implement 10 through a field. A laterally extending toolbar 18 is generally transverse to tow bar 14 and thereby generally transverse to the direction implement 10 is towed during planting operations. A plurality of seed planting units (or row units) 20 are connected to toolbar 18 in a side by side relationship, each of the seed planting units (row units) being substantially identical to the others. In the exemplary embodiment shown in FIG. 1, seed planting implement 10 includes sixteen seed planting units 20, only some of which are identified with reference numbers; however, it should be understood that more or fewer seed planting units can be provided on a particular seed planting implement.

Figure 2:
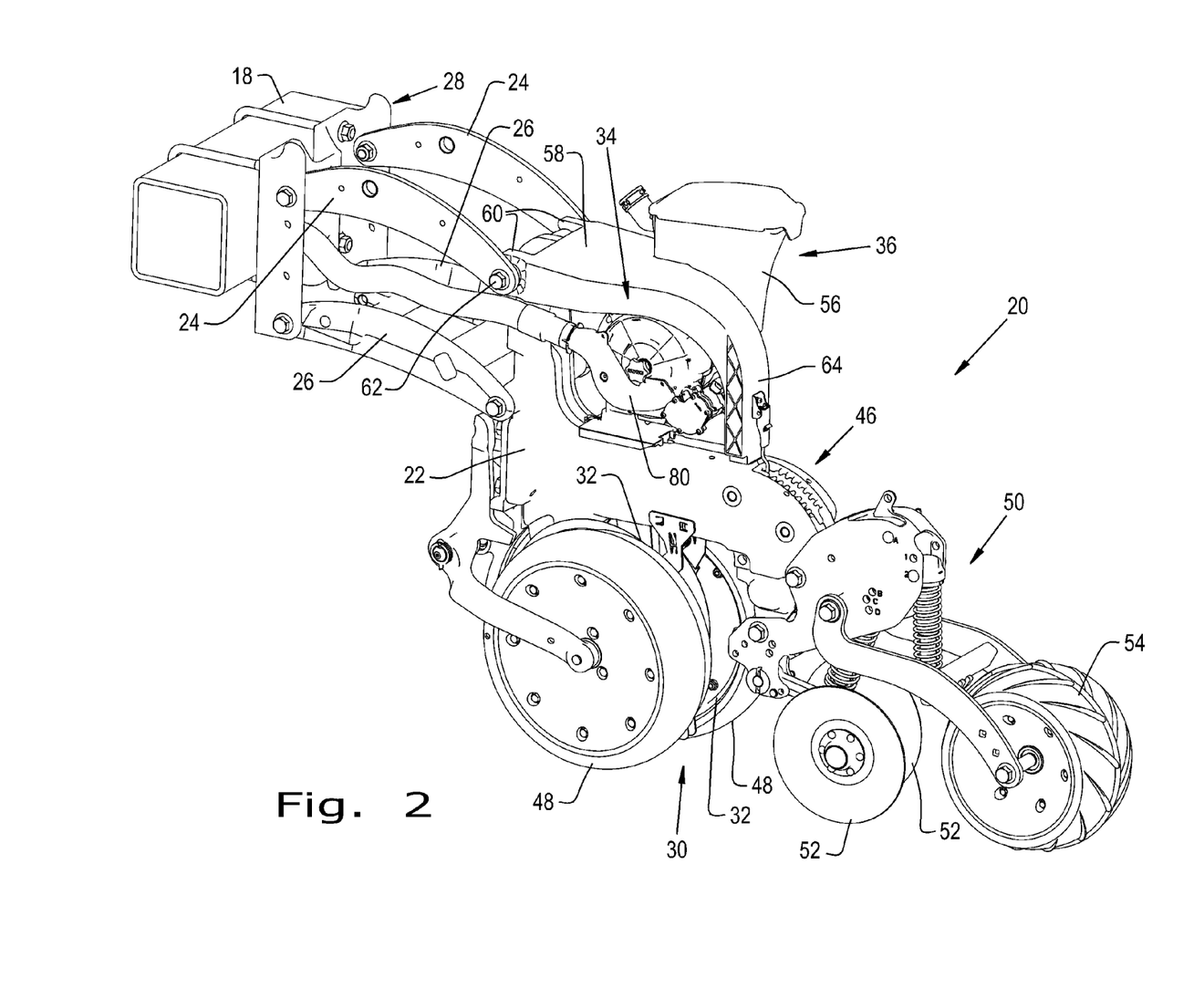
FIG. 2 is a perspective view of a row unit of an agricultural seed planting implement, the row unit having an air supply system as disclosed herein.
Figure 3:
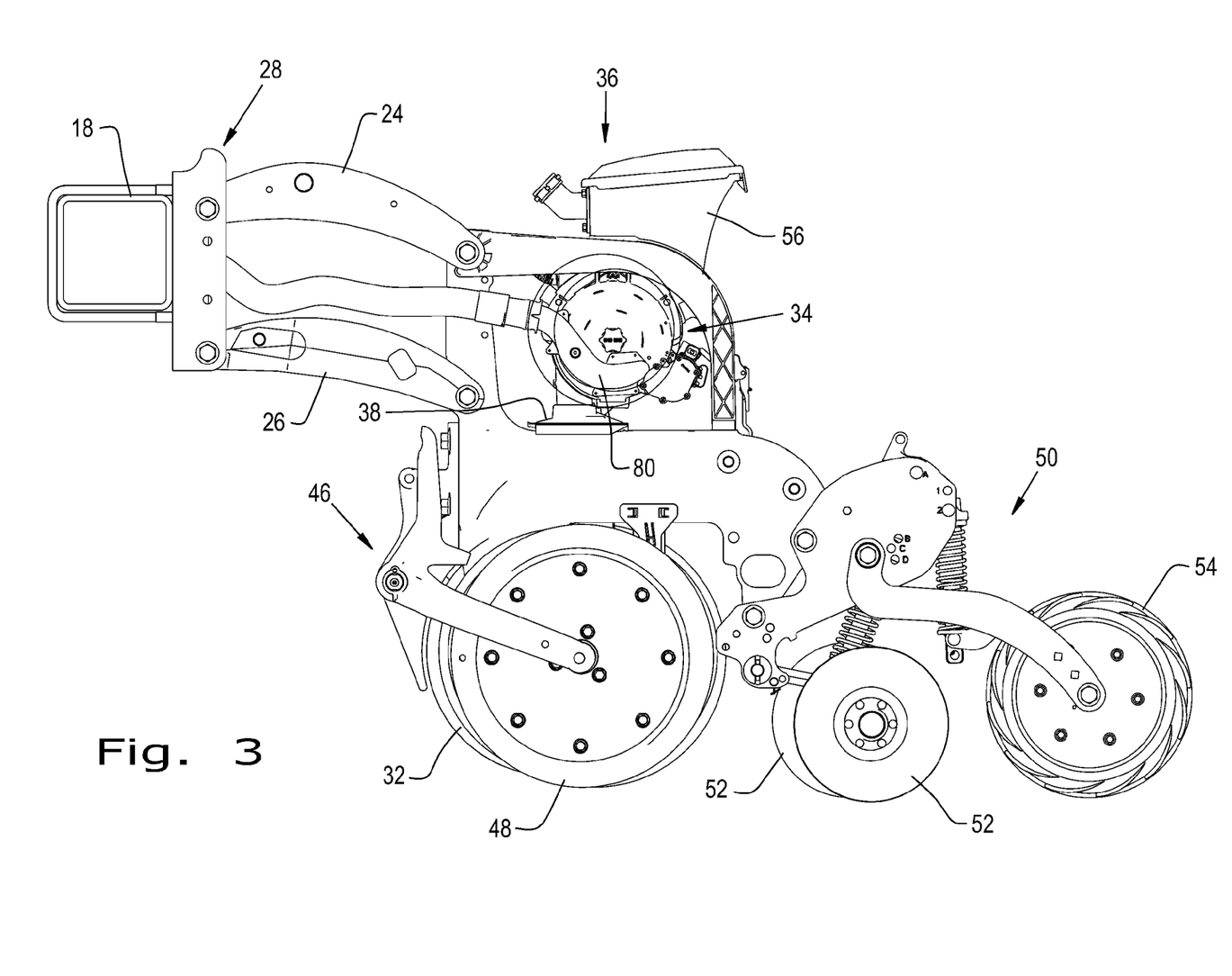
FIG. 3 is an elevational view of the row unit shown in FIG. 2.

Referring now to FIGS. 2 and 3, each seed planting unit 20 includes a frame 22 that is connected to toolbar 18 by upper arms 24 and lower arms 26, each arm 24, 26 being connected to frame 22 and tool bar 18 via a connector assembly 28. Each seed planting unit 20 extends rearward from toolbar 18 to plant a row of seeds as seed planting implement 10 is towed across a field. The individual planting units 20 are spaced along toolbar 18 to provide planted seed rows of a desired spacing. During a planting operation, forward movement of seed planting implement 10 causes each seed planting unit 20 to form a seed trench, deposit equally spaced seeds in the seed trench and close the seed trench over the seeds deposited in the seed trench.

Each seed planting unit 20 includes a ground penetrating or seed trench opening assembly 30 having a pair of forwardly and downwardly angled opening discs 32 that converge forwardly and downwardly to open a furrow or seed trench as seed planting implement 10 moves forward. A seed metering system 34 is part of a seed hopper assembly 36. Seed metering assembly 34 provides individual seeds at a controlled rate to a seed tube 38 for deposit in the bottom of the seed trench formed. A vacuum system 40 (FIG. 1), which includes a fan 42 and air lines 44, provides vacuum to seed metering system 34 for the operation of the seed metering system in supplying seeds to seed tube 38.

A depth control assembly 46 adjustably positions a pair of gauge wheels 48 operating adjacent opening discs 32. One gauge wheel 48 is provided adjacent each opening disc 32.

A seed trench closing mechanism 50 at the trailing end of each seed planting unit 20 closes the seed trench after the seeds have been deposited in the seed trench. Seed trench closing mechanism 50 includes a pair of closing wheels 52 that operate on opposite sides of the seed trench to move soil back into the seed trench and over the seeds deposited in the bottom of the seed trench. A trailing press wheel 54 travels along the top of the seed trench and firms the soil replaced in the seed trench to eliminate air pockets.

Figure 5:
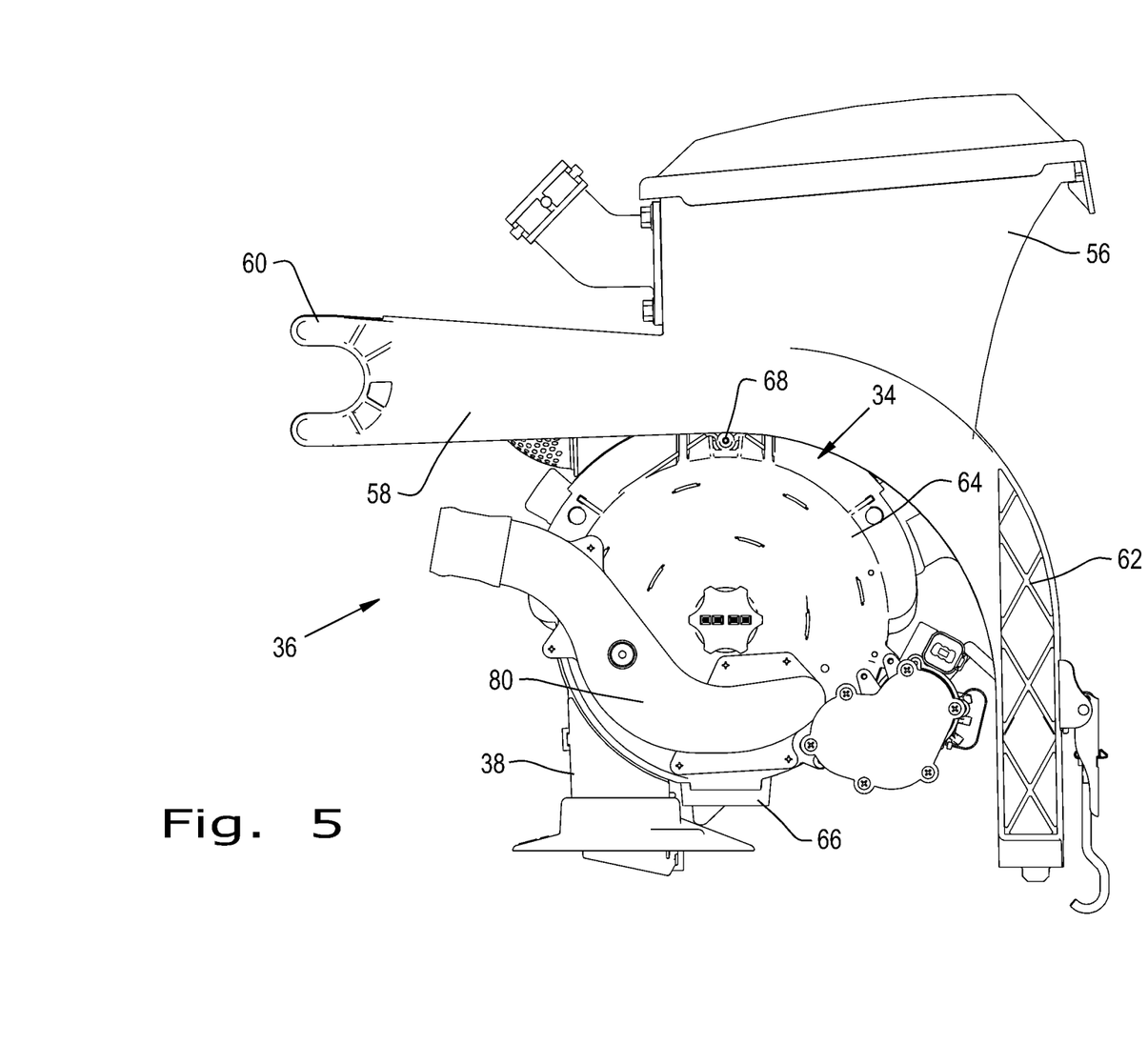
FIG. 5 is an elevational view of the seed hopper assembly shown in FIG. 4.

With reference now to FIGS. 4 and 5, seed hopper assembly 36 is shown. Seed hopper assembly 36 includes and defines air supply system 100, as will be described in greater detail hereinafter. Seed hopper assembly 36 includes a monolithic body generally defining a seed hopper 56 and a base portion 58 including a pair of tabs 60 engaging upper arms 62 and frame 22, and a downwardly depending leg 62 engaging and frame 22.

Seed metering system 34 includes a seed meter 64 that is removably held in seed hopper assembly 36 by a disconnectable hinge 66 at the bottom thereof and a latch mechanism 68 at the top thereof.

Figure 6:
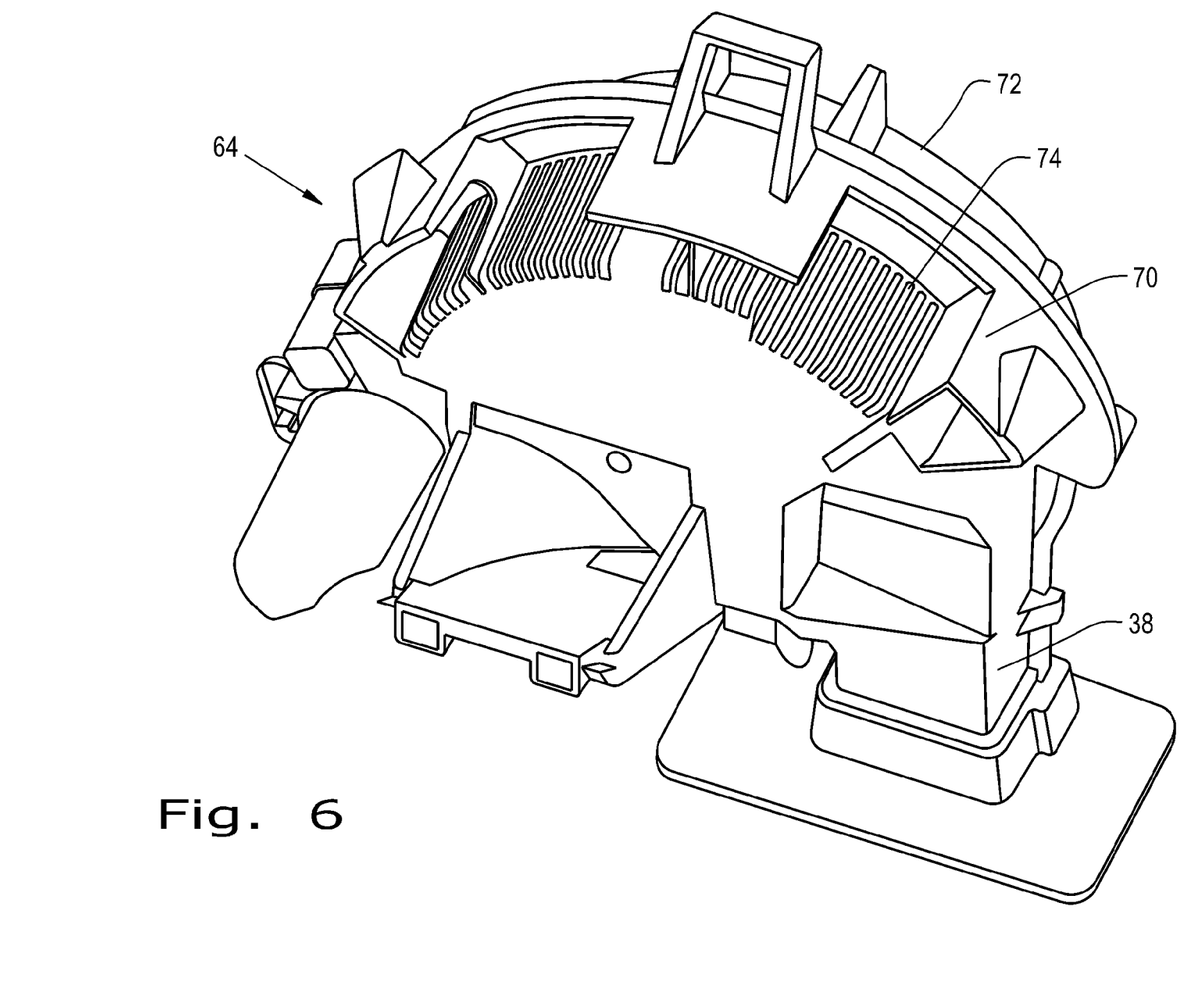
FIG. 6 is a perspective view of a seed meter in the seed hopper assembly shown in FIGS. 4 and 5.

Referring now to FIG. 6, seed meter 64 has a seed meter housing cover 70 and a seed meter housing back 72. Seed meter housing cover 70 defines air inlet vents 74 at the top thereof. A vacuum inlet 78 (FIG. 8) defined in seed meter housing cover 70 engages a vacuum supply manifold 80 (FIG. 4) that is connected to vacuum system 40.

Figure 7:
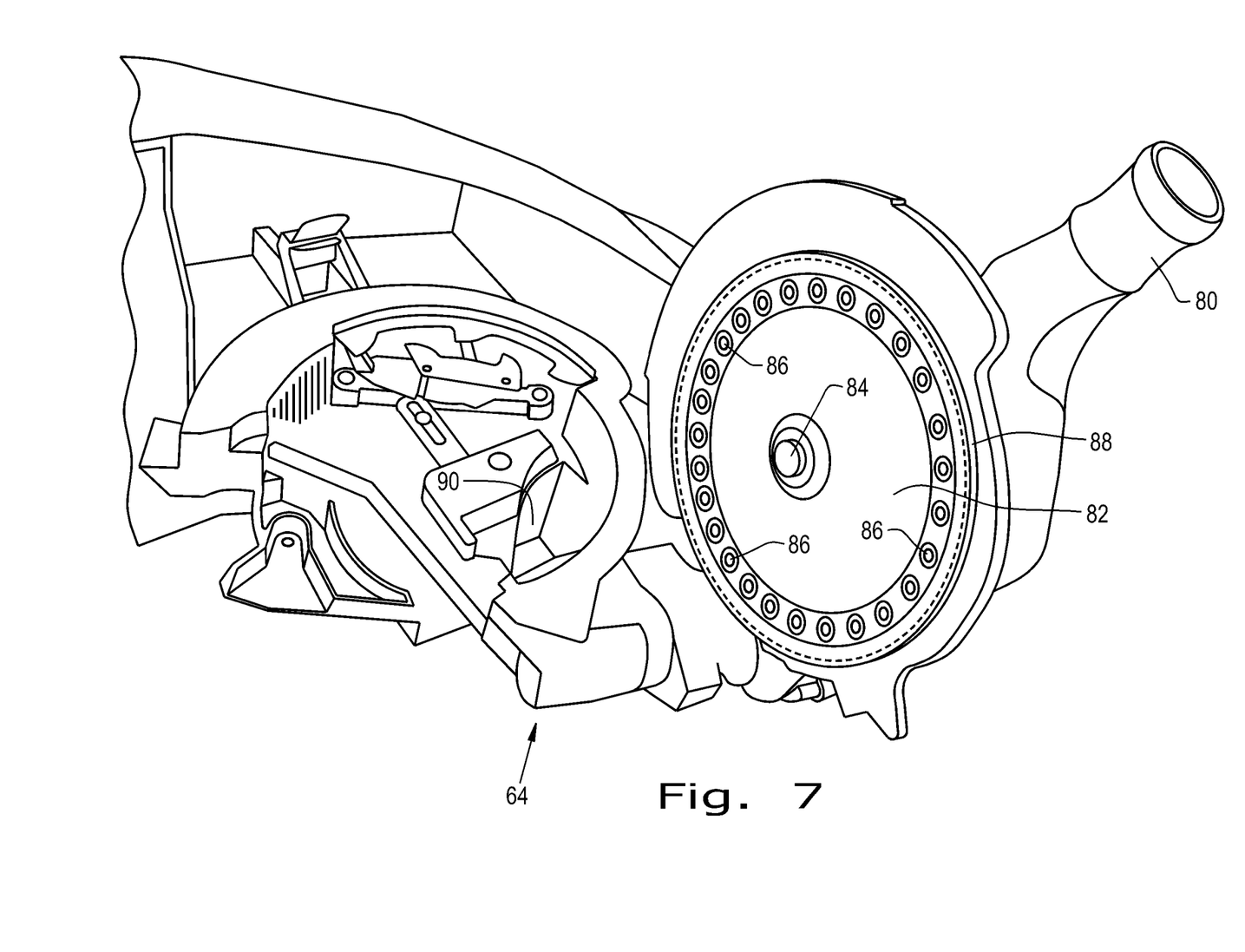
FIG. 7 is a perspective view of the seed meter partly disassembled.

FIG. 7 shows seed meter housing cover 70 and seed meter housing back 72 in an open condition, exposing a seed disc 82 therein. Seed disc 82 is rotatably connected on a shaft 84. Seed disc 82 defines a plurality of seed cells 86 near the periphery thereof. The edge of seed disc 82 defines a plurality of drive teeth 88 which are drivingly connected to a drive system (not shown) for rotating seed disc 82 at a controlled rate.

Seed meter housing back 72 defines a seed reservoir 90 to receive seeds from seed hopper 56. Seeds (not shown) in seed reservoir 90 are exposed to seed disc 82 as seed disc 82 rotates past seed reservoir 90.

Figure 8:
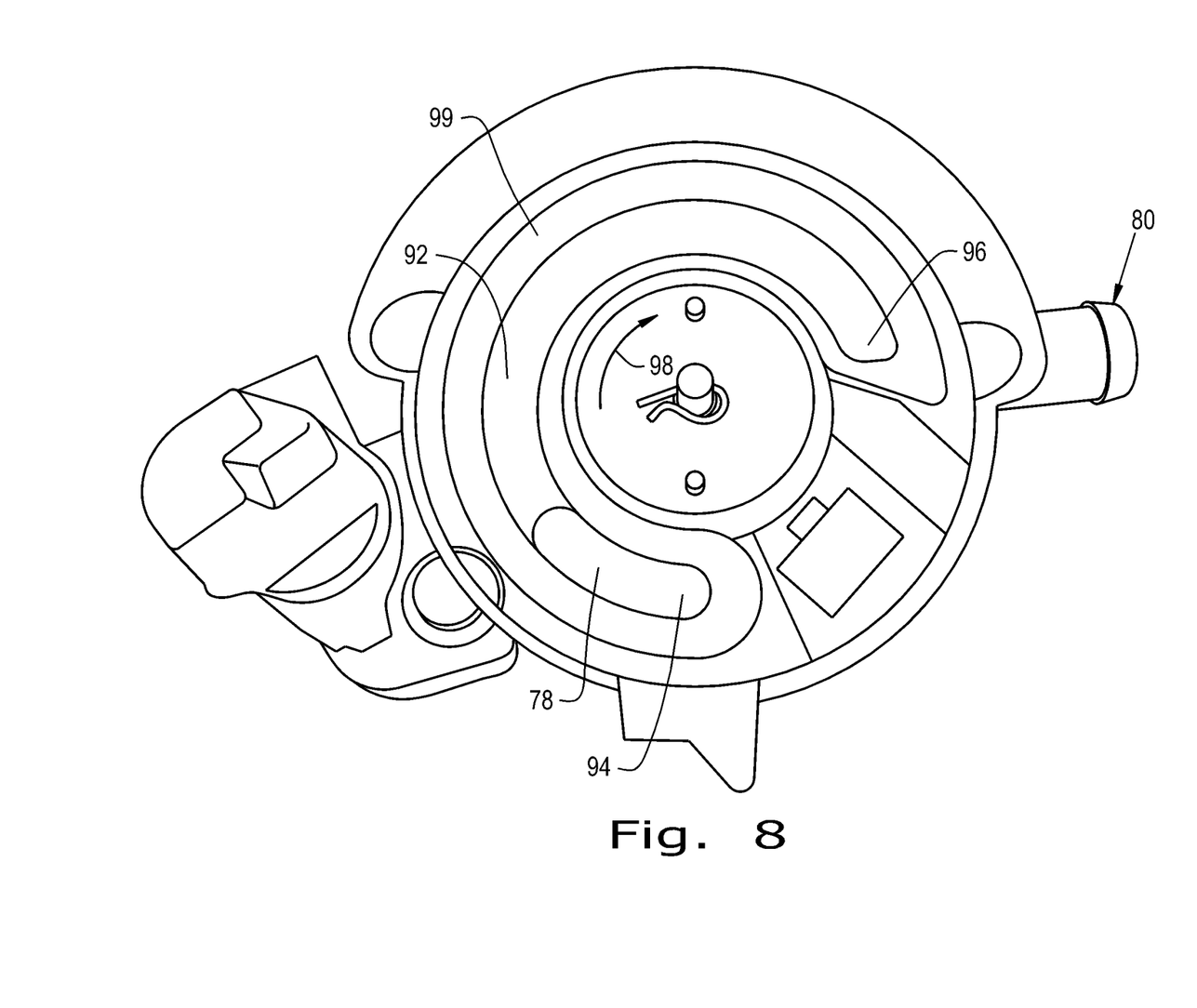
FIG. 8 is a perspective view of a portion of the seed meter shown in FIG. 7, with parts thereof removed.

FIG. 8 illustrates seed meter housing cover 70 without seed disc 82 installed therein. Seed meter housing cover 70 defines a vacuum chamber 92 extending from vacuum inlet 78 in an arcuate path corresponding to part of the path followed by rotating seed cells 86. Vacuum chamber 92 has an initial end 94 and a terminal end 96 with respect to the rotational direction of seed disc 82, which is illustrated by arrow 98. Vacuum chamber 92 is in fluid flow relationship with vacuum inlet 78 and vacuum supply manifold 80 of vacuum system 40. Seeds in seed reservoir 90 are drawn toward seed disc 82 at initial end 94 of vacuum chamber 92, such that seeds will engage with each seed cell 86 so long as vacuum is supplied to vacuum chamber 92. Seeds in or against a seed cell 86 will remain therein or there against as the seed cell rotates along vacuum chamber 92 from initial end 94 to terminal end 96. Any seeds that are against seed disc 82 in an area between adjacent seed cells 86 will remain in or will fall back into seed reservoir 90 as seed disc 82 rotates past. As an individual seed cell 86 rotates past terminal end 96 of vacuum chamber 92, a seed in or against the seed cell is released there from when vacuum no longer exists on the opposite side of seed disc 82. As seeds are released from seed disc 82 in the area of terminal end 96, the seeds fall into seed tube 38 for placement in the seed trench formed by seed trench opening assembly 30. A rubber gasket or other suitable sealing material 99 can be provided along the open edge of vacuum chamber 92, to provide a seal against seed disc 82.

Figure 9:
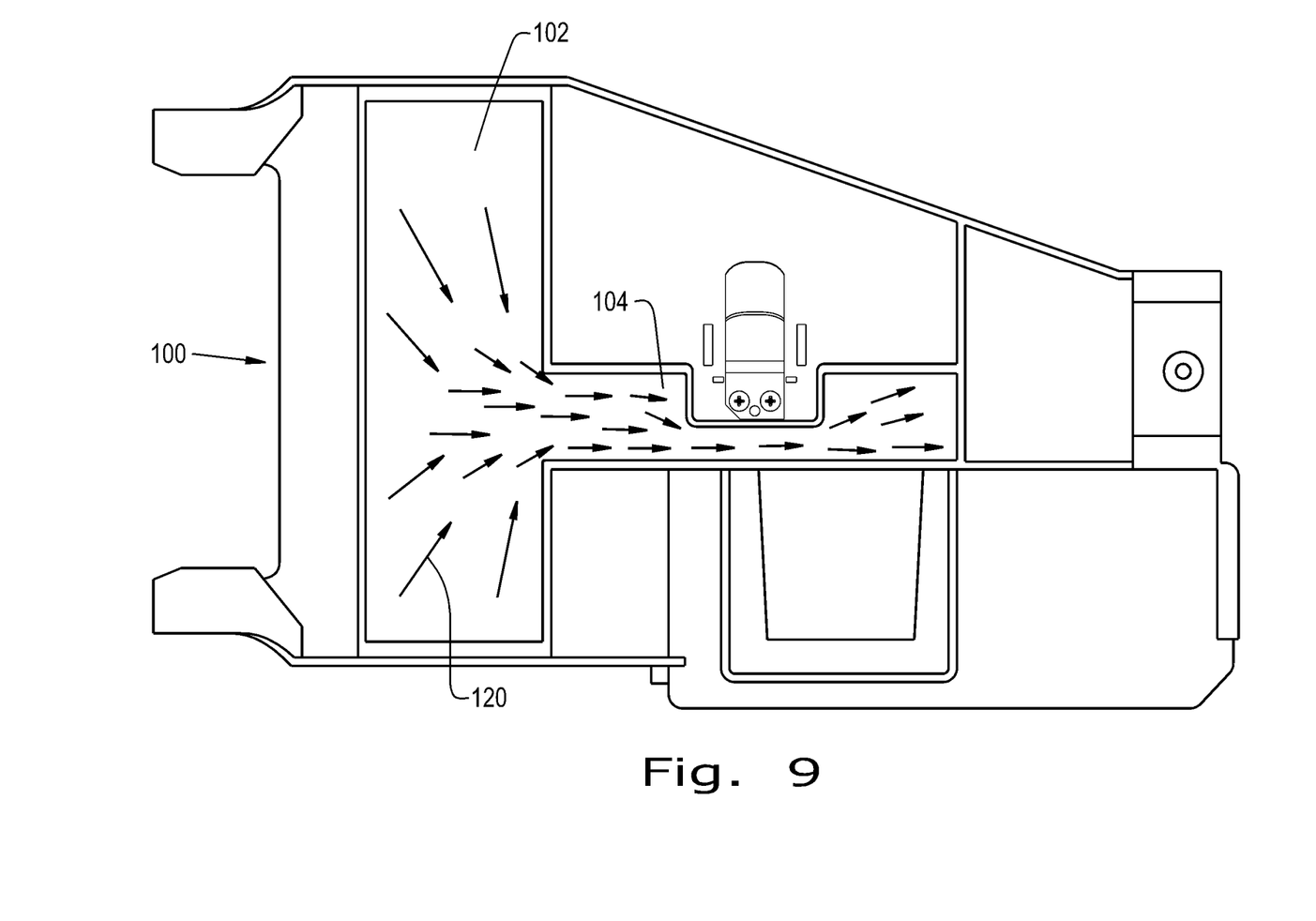
FIG. 9 is a plan view of an air inlet manifold and air channel of the air supply system disclosed herein.

Air supply system 100 is defined in seed hopper assembly 36, and more specifically, in base portion 58 of seed hopper assembly 36. Air supply system 100 supplies air to air inlet vents 74 for the operation of seed metering system 34 and seed meter 64 thereof. Referring now to FIG. 9, air supply system 100 includes an air inlet manifold 102 formed as a recess or depression in base portion 58. In the exemplary embodiment shown, air inlet manifold 102 is substantially rectangular in shape; however, it should be understood that air inlet manifold 102 also may be of other shapes and configurations. The rectangular shape shown is merely exemplary in nature. An air channel 104 is connected in airflow communication with air inlet manifold 102, and also is formed as a recess or depression defined in base portion 58. Again, air channel 104 of the exemplary embodiment is shown having a substantially rectangular shape; however, other shapes also can be used. Air flows from air inlet manifold 102 to air channel 104. Air channel 104 extends from air inlet manifold 102 to an end area of air channel 104 that is positioned above air inlet vents 74 in seed meter housing cover 70. Accordingly, air can flow freely from air inlet manifold 102 through air channel 104 to air inlet vents 74, and then through seed metering system 34, including through vacuum chamber 92.

Air inlet manifold 102 is provided with an opening thereto, and an inlet screen 106 is provided to cover the manifold opening. As shown in the exemplary embodiment, air inlet manifold 102 is provided in the bottom of base portion 58 and opens downwardly, so that inlet screen 106 is downwardly facing. Inlet screen 106 is thereby less prone to plugging or obstruction, since dirt and debris does not easily settle on the downwardly facing surface of inlet screen 106. Further, when the operation of implement 10 is stopped, and vacuum system 40 switched off, some of the dirt and debris that may be held against inlet screen 106 due to the vacuum applied will naturally fall there from when the vacuum is off. Accordingly, air supply system 100 can operate efficiently and effectively for prolonged periods without servicing or cleaning being required.

Figure 10:
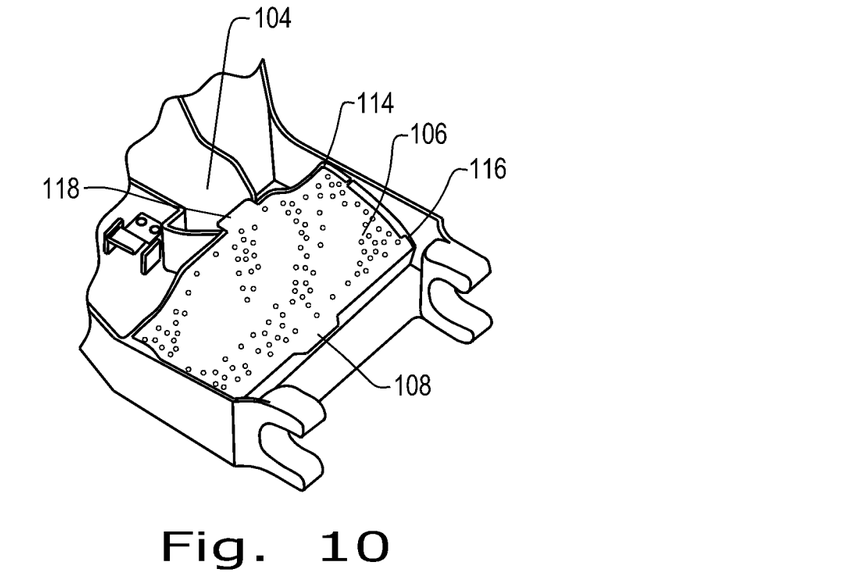
FIG. 10 is a fragmentary perspective view of the air supply system.
Figure 11:
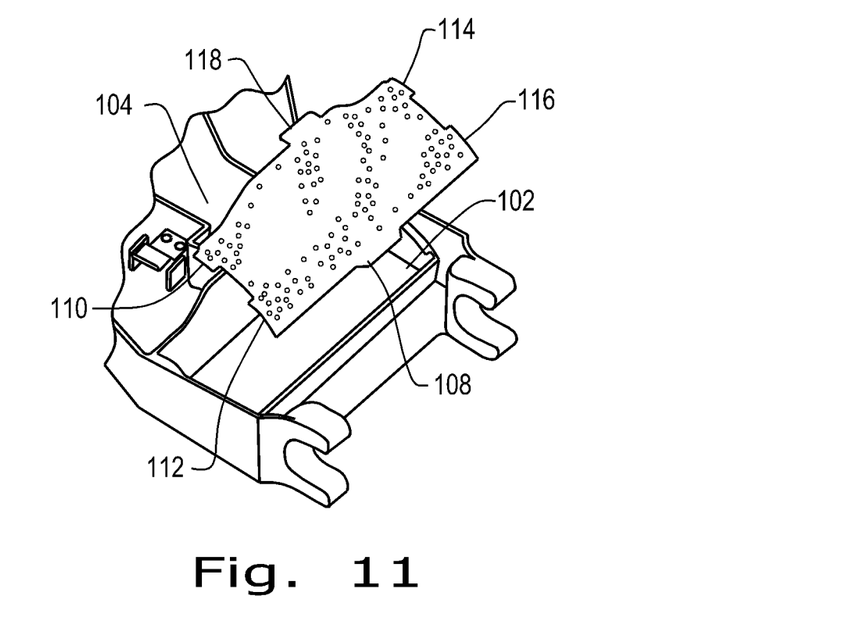
FIG. 11 is another fragmentary perspective view of the air supply system.

As shown in FIGS. 10 and 11, air inlet screen 106 is provided over air inlet manifold 102 in an interference fit relationship, such that air inlet screen 106 is easily removed from its operating position for cleaning or replacement if necessary. To that end, air inlet screen 106 includes a lip 108, interference corner edges 110, 112, 114, 116 and a handle or tab 118. Lip 108 and corner edges 110, 112, 114, 116 engage surfaces defining air inlet manifold 102 such that inlet screen 106 is held in operating position covering the opening to air inlet manifold 102. Inlet screen 106 is easily removed by grasping and pulling, or by prying against handle 118 to dislodge the interference engagement of screen 106 in air inlet manifold 102.

Air channel 104, as formed in base portion 58, is open, downwardly facing. However, the open edge thereof is cooperatively shaped with seed meter housing cover 70 and seed meter housing back 72 so that, with meter 64 installed in the operating position thereof and held in place by hinge 66 and latch mechanism 68, seed meter housing cover 70 and seed meter housing back 72 closely confront the opening to air channel 104 and thereby partially define the air channel. Accordingly, air channel 104 is effectively enclosed for contained airflow between air inlet manifold 102 and air inlet vents 74.

As described above, when seed metering system 34 is fully installed and operational, air flow indicated by arrows 120 in FIG. 9 enters air supply system 100 through inlet screen 106 into air inlet manifold 102, and from air inlet manifold 102 through air channel 104 to air inlet vents 74. However, with air inlet screen 106 removed, air inlet manifold 102 is easily cleaned. So also, with seed meter 54 removed, air channel 104 is exposed for easy cleaning. Accordingly, while air supply system 100 is less prone to plugging or obstruction due to its location and orientation, it is also easily serviced in the event that some obstruction occurs.

In the exemplary embodiment shown, air inlet manifold 102 is generally in a forward position relative to seed meter 64 and the direction of travel for seed planting implement 10 during a planting operation. However, it should be understood that air inlet manifold 102 can be provided at other locations as well; with an air channel 104 extending therefrom to the air inlet vents 74 of the seed meter for which it is used. For example, an air inlet manifold having a screen thereon can be provided in a rearward position relative to the location of a seed meter and the direction of travel for the seed planting implement on which it is used. Still further, a manifold can be provided in a generally side-by-side or aligned relationship with a seed meter. The integrated manifold and channel disclosed herein allows the placement of an inlet manifold wherever advantageous, such as were the environment is generally the cleanest during operation, and/or where there is sufficient room for installation and access. Still further, it should be understood that portions or all of the manifold and/or channel can be provided as integral features in components other than the seed hopper base portion 58. For example, portions or the entire manifold and air channel can be provided in one or both of seed meter housing cover 70 and seed meter housing back 72.

Air supply system 100 can be provided in various locations at various distances without additional cost, when seed hopper base portion 58 and seed hopper 56 are provided as a monolithic body of cast or molded synthetic material. An air inlet manifold and an air chamber are provided not as additional parts but instead as variations to the cast or molded monolithic body of seed hopper base portion 58 and seed hopper 56, as shown in the exemplary embodiment.

While an air supply system has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural seed planting implement, comprising:
   a seed planting unit including a seed hopper assembly;
   a seed meter connected to said seed hopper assembly;
   a vacuum system fluidly connected to said seed meter; and
   an air supply system in fluid flow communication with said vacuum system through said seed meter, said air supply system being integrally formed in said seed hopper assembly, said air supply system including a manifold and a channel extending from said manifold, said seed meter including air inlet vents in fluid flow communication with said channel.

2. The agricultural seed planting implement of claim 1, said manifold having a manifold opening facing downward, and a screen covering said manifold opening.

3. The agricultural seed planting implement of claim 1, said channel having a channel opening between said manifold and said seed meter, and said seed meter including a housing closely confronting the channel opening.

4. The agricultural seed planting implement of claim 3, said manifold having a manifold opening facing downward, and a screen covering said manifold opening.

5. The agricultural seed planting implement of claim 1, said air supply system including a manifold having a manifold opening there to, and a channel extending from said manifold, said manifold being in a forward position relative to said seed meter with respect to a direction of travel for said agricultural seed planting implement during a seed planting operation.

6. The agricultural seed planting implement of claim 5, wherein said manifold opening is downwardly facing, a screen covers said manifold opening, and said screen is held in place by an interference fit.

7. The agricultural seed planting implement of claim 6, wherein said channel as a channel opening between said manifold and said seed meter, and said seed meter includes a seed meter housing closely confronting said channel opening.

8. An agricultural seed planting implement, comprising:
a monolithic body defining a seed hopper and an air supply system having an air inlet opening;
a seed meter connected to said monolithic body, said seed meter including air inlet vents in fluid flow communication with said air supply system; and
a vacuum system fluidly connected to said seed meter and in fluid flow communication with said air supply system through said seed meter, said air supply system including a manifold having a downwardly facing manifold opening, and a screen covering said downwardly facing manifold opening, said air supply system including an air channel in fluid flow communication between said manifold and said air inlet vents, said as channel having a downwardly facing air channel opening, and said seed meter including a seed meter housing confronting said downwardly facing air channel opening.

9. The agricultural seed planting implement of claim 8, said screen held to said downwardly facing manifold opening by interference engagement.

10. The agricultural seed planting implement of claim 8, said air supply system including an air channel having a downwardly facing air channel opening, and said seed meter including a seed meter housing confronting said downwardly facing air channel opening.

11. The agricultural seed planting implement of claim 8, said air supply system including a manifold and a channel in fluid flow communication between said manifold and said air inlet vents; and said manifold being in a forward position relative to said seed meter with respect to a direction of travel for said agricultural seed planting implement during a seed planting operation.

12. An agricultural seed planting implement, comprising:
a seed metering system including a seed meter;
a monolithic body defining a seed hopper and an air supply system including an air inlet manifold having an air inlet manifold opening and an air channel in fluid flow communication with said air inlet manifold; and
air inlet vents in said seed metering system in fluid flow communication with said air channel, said air inlet manifold disposed in a forward position relative to said seed meter with respect to a direction of travel for said agricultural seed planting implement during a seed planting operation.

13. The agricultural seed planting implement of claim 12, wherein said air inlet manifold opening is downwardly facing, and a screen covers said air inlet manifold opening.

14. An agricultural seed planting implement, comprising:
a seed metering system including a seed meter;
a monolithic body defining a seed hopper and an air supply system including an air inlet manifold having an air inlet manifold opening and an air channel in fluid flow communication with said air inlet manifold; and
air inlet vents in said seed metering system in fluid flow communication with said air channel,
wherein said air channel has a downwardly facing air channel opening, and said seed meter includes a seed meter housing confronting said downwardly facing air channel opening.

\* \* \* \* \*